(12) United States Patent
Dziurda et al.

(10) Patent No.: US 8,833,389 B2
(45) Date of Patent: Sep. 16, 2014

(54) CAPTURED CHECK BALL VALVE CARTRIDGE

(75) Inventors: Robert Alan Dziurda, Waterford, MI (US); Frederic Zenczenko, West Bloomfield, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 63 days.

(21) Appl. No.: 13/541,334

(22) Filed: Jul. 3, 2012

(65) Prior Publication Data

US 2014/0007955 A1 Jan. 9, 2014

(51) Int. Cl.
*F16K 15/04* (2006.01)

(52) U.S. Cl.
USPC ............... 137/539; 137/454.2; 137/315.11; 137/540

(58) Field of Classification Search
USPC ............ 137/539, 533.13, 15.22, 533.15, 137/516.25, 315.11, 613, 543.19, 515.5, 137/316, 315.21, 614.21, 614.2, 540, 137/543.17, 454.2, 454.6
See application file for complete search history.

(56) References Cited

U.S. PATENT DOCUMENTS

| 4,776,430 A | * | 10/1988 | Rule | 184/1.5 |
| 5,495,916 A | * | 3/1996 | DiMatteo | 184/1.5 |

* cited by examiner

*Primary Examiner* — Kevin Lee
*Assistant Examiner* — P. Macade Nichols

(57) ABSTRACT

A check ball valve cartridge assembly is provided for regulating fluid flow through a fluid pressure line in an automotive transmission. The assembly includes a cartridge having a side wall forming a hollow interior cavity in the cartridge and a lip extending from the side wall toward a central axis of the cartridge. The assembly also has a check ball, which is disposed at least partially within the interior cavity of the cartridge. The lip of the cartridge is configured to prevent the check ball from exiting the interior cavity of the cartridge. A biasing member is disposed at least partially within the interior cavity of the cartridge and contacts the check ball. The assembly may include a pair of orientation features extending from the side wall of the cartridge for aligning the cartridge for installation within the automotive transmission.

20 Claims, 4 Drawing Sheets

CAPTURED CHECK BALL VALVE CARTRIDGE

FIELD

The present disclosure relates to a check ball valve assembly, and more particularly to a check ball valve assembly having a cartridge housing a check ball and a biasing member.

BACKGROUND

The statements in this section merely provide background information related to the present disclosure and may or may not constitute prior art.

In pressurized fluid systems, check ball valves are used to regulate fluid flow by allowing flow in one direction while blocking flow in the opposite direction. Typically, a check ball valve includes a check ball and a ball seat. When pressurized fluid flows in the direction away from the ball seat, the check ball is forced off the ball seat and the fluid flows between the check ball and the inner surface of the fluid passage. When the pressurized fluid flows toward the ball seat, the check ball is forced against the ball seat, sealing off any opening for fluid to pass around the ball.

Assembling check ball valves can present challenges because the ball and spring can be easily lost. If a housing or cartridge is used, such structure typically impedes flow more than desired. Accordingly, it is desirable to utilize a check ball valve that is easy to assembly without undesirably impeding fluid flow in an open state.

SUMMARY

A check ball valve assembly for an automotive transmission is provided having a cartridge that can be easily installed, by hand if desired, and that has minimal fluid restriction therethrough. Accordingly, no press or other tool is necessary to assembly the ball check valve assembly on an assembly line.

In one variation, which may be combined with or separate from the other variations described herein, a check ball valve assembly for regulating fluid flow through a fluid pressure line in an automotive transmission is provided. The check ball valve assembly includes a cartridge having a side wall forming a hollow interior cavity in the cartridge. The cartridge also has a lip extending from the side wall toward a central axis of the cartridge. A check ball is disposed at least partially within the interior cavity of the cartridge. The lip of the cartridge is configured to prevent the check ball from exiting the interior cavity of the cartridge. A biasing member is disposed at least partially within the interior cavity of the cartridge and contacts the check ball. A mating surface forms an opening therethrough. The mating surface is disposed adjacent to the lip of the cartridge and outside of the interior cavity of the cartridge. The biasing member is configured to bias the check ball against and into contact with the mating surface to seat the check ball over the opening of the mating surface.

In another variation, which may be combined with or separate from the other variations described herein, a check ball valve cartridge assembly for regulating fluid flow through a fluid pressure line is provided. The check ball valve cartridge assembly is configured to be installed within an automotive transmission. The check ball valve cartridge assembly includes a cartridge having a side wall forming a hollow interior cavity in the cartridge. The cartridge also has a lip extending from the side wall toward a central axis of the cartridge. A check ball is disposed at least partially within the interior cavity of the cartridge. The lip of the cartridge is configured to prevent the check ball from exiting the interior cavity of the cartridge. A biasing member is disposed at least partially within the interior cavity of the cartridge and contacting the check ball. A pair of orientation features extends from the side wall for aligning the cartridge for installation within the automotive transmission. The pair of orientation features defines a flow path opening therebetween to allow fluid to flow through the flow path opening.

In yet another variation, which may be combined with or separate from the other variations described herein, a check ball valve assembly for regulating fluid flow through a fluid pressure line of an automotive transmission is provided that includes a cartridge, a check ball, a pair of flat tabs, a coil spring, a valve body, and a transfer plate. The cartridge has a cylindrical side wall forming a hollow interior cavity in the cartridge and a lip extending from the side wall toward a central axis of the cartridge. The lip has a lip edge defining a lip opening. The lip edge defines a lip edge diameter, and the side wall defines an interior cavity diameter. The check ball is disposed at least partially within the interior cavity of the cartridge. The lip of the cartridge is configured to prevent the check ball from exiting the interior cavity of the cartridge. The check ball defines a check ball diameter. The interior cavity diameter and the check ball diameter are greater than the lip edge diameter.

The pair of flat tabs extends from the side wall for aligning the cartridge. Each flat tab contacts the side wall at a contact axis. The pair of flat tabs extends substantially perpendicular from the side wall at the contact axes. The pair of flat tabs are disposed substantially parallel to each other. The coil spring is disposed at least partially within the interior cavity of the cartridge and contacts the check ball. The valve body has portions forming an inner opening having a cylindrical surface. The cylindrical surface mates with the side wall of the cartridge. The pair of flat tabs is configured to be pressed toward each other to insert the cartridge into the inner opening of the valve body. The pair of flat tabs defines a flow path opening therebetween to allow fluid to flow through the flow path opening.

The transfer plate has portions forming an opening through the transfer plate. The transfer plate is disposed adjacent to the lip of the cartridge. The transfer plate is disposed outside of the interior cavity of the cartridge. The coil spring is configured to bias the check ball against and into contact with the transfer plate to seat the check ball over the opening of the transfer plate, and the check ball is free from contact with the lip edge. The check ball is movable between first and second positions. In the first position, the check ball is biased against and in contact with the transfer plate, and the check ball is seated over the opening of the transfer plate. In the second position, the check ball is unseated from the transfer plate and compressed against the coil spring.

Further aspects and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

Figure 1A:
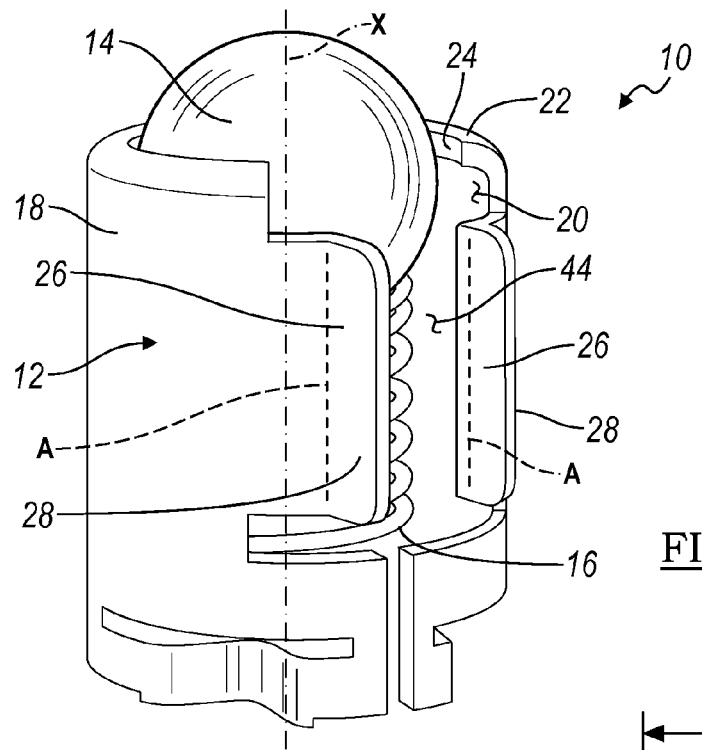
FIG. 1A is a perspective view of an example of a check ball valve cartridge assembly, according to the principles of the present disclosure.
Figure 1B:
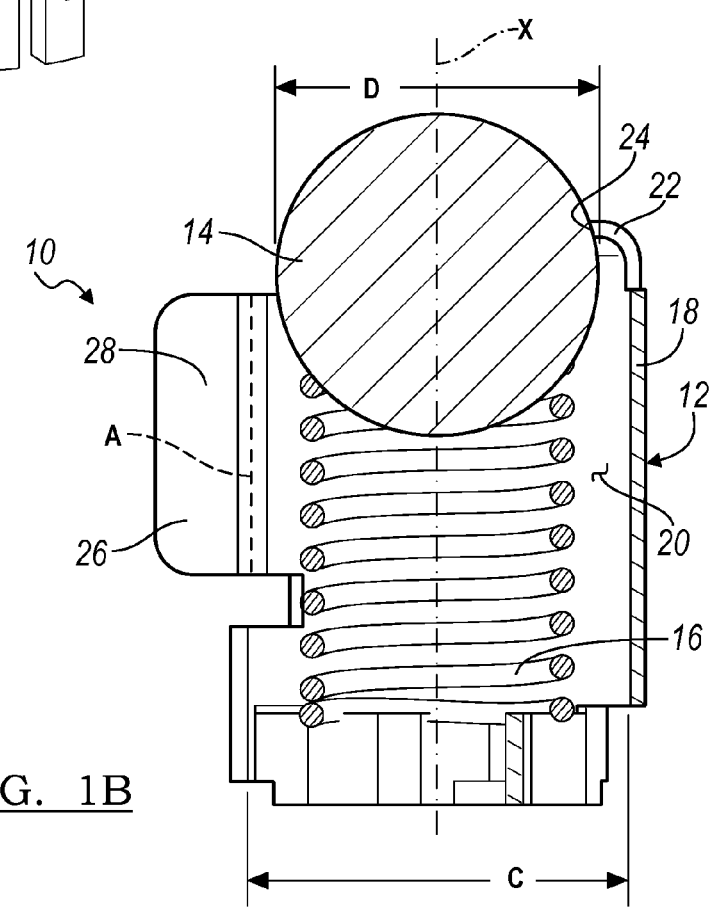
FIG. 1B is a side cross-sectional view of the check ball valve cartridge assembly shown in FIG. 1A, in accordance with the principles of the present disclosure.
Figure 1C:
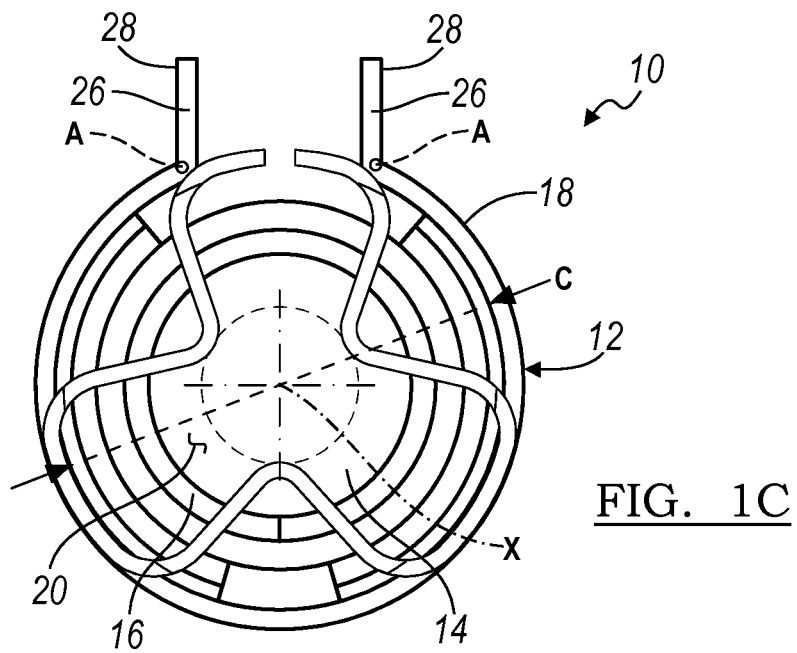
FIG. 1C is an end view of the check ball valve cartridge assembly shown in FIGS. 1A-1B, in accordance with the principles of the present disclosure.
Figure 1D:
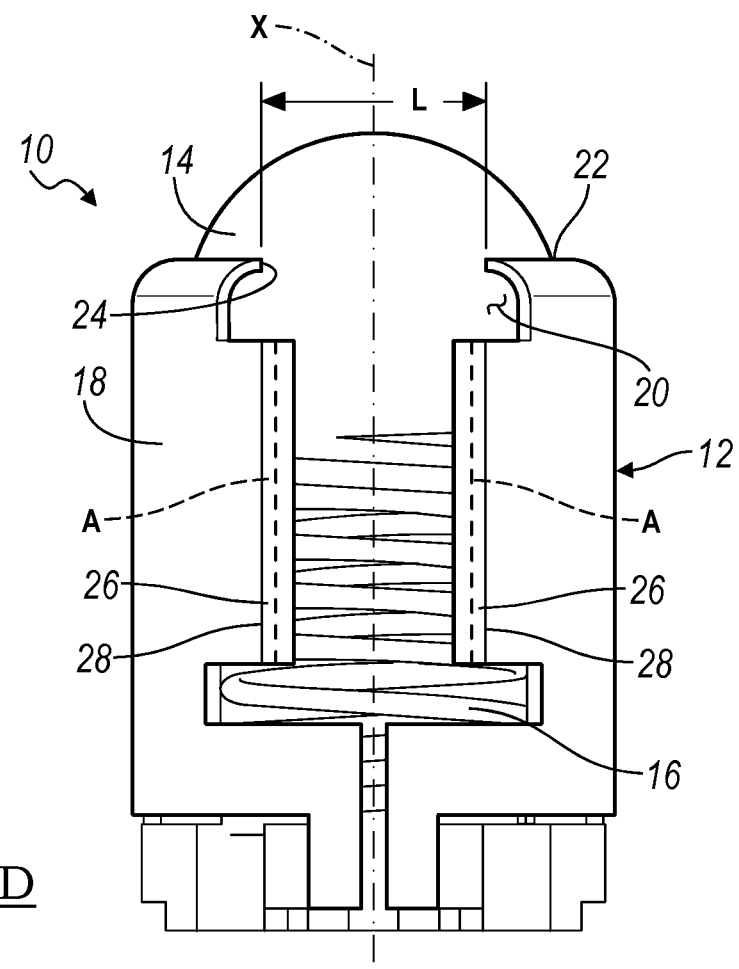
FIG. 1D is a front view of the check ball valve cartridge assembly shown in FIGS. 1A-1C, according to the principles of the present disclosure.
Figure 2:
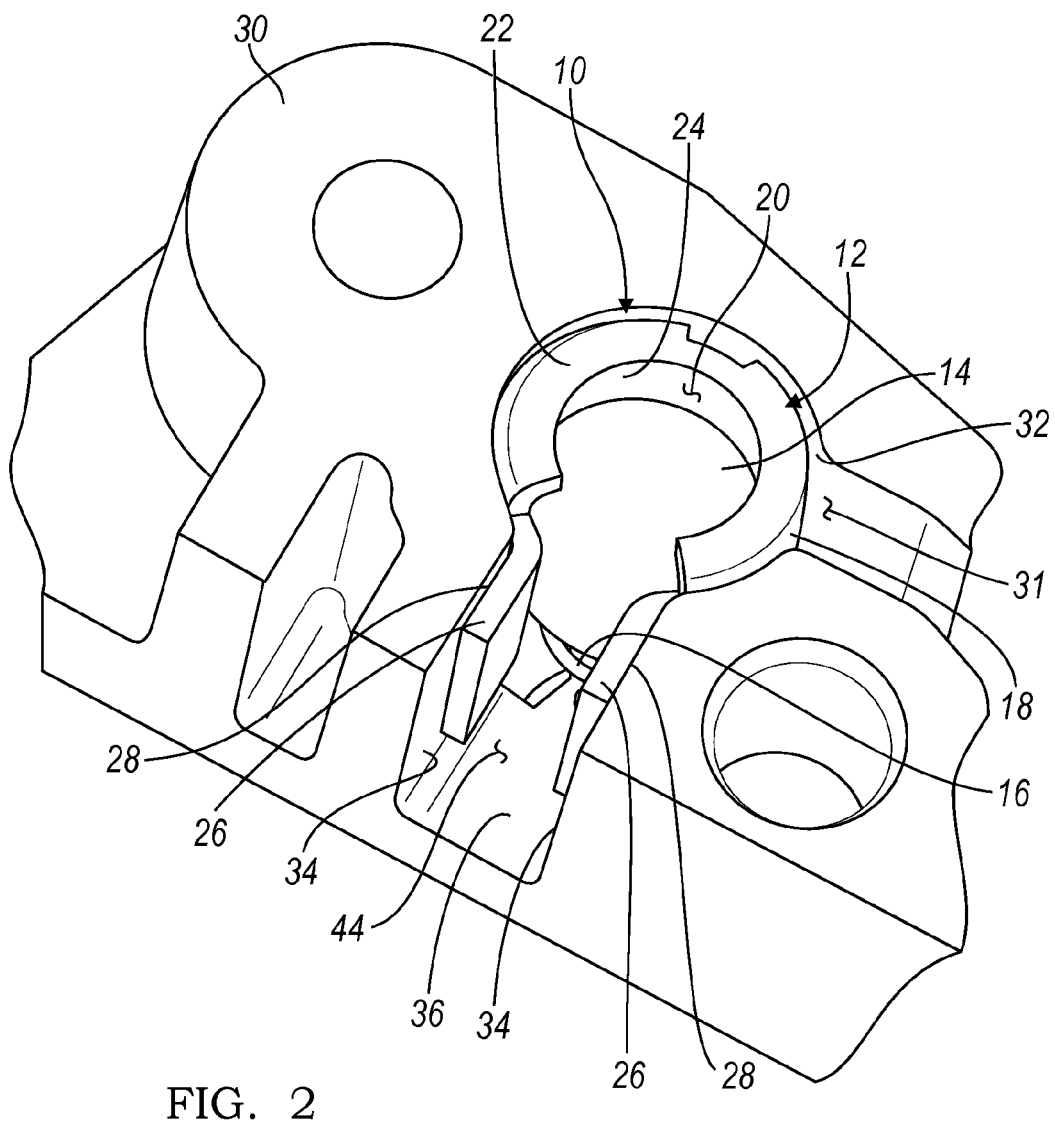
FIG. 2 is a perspective view of the check ball valve cartridge assembly of FIGS. 1A-1D installed in a valve body, according to the principles of the present disclosure.
Figure 3A:
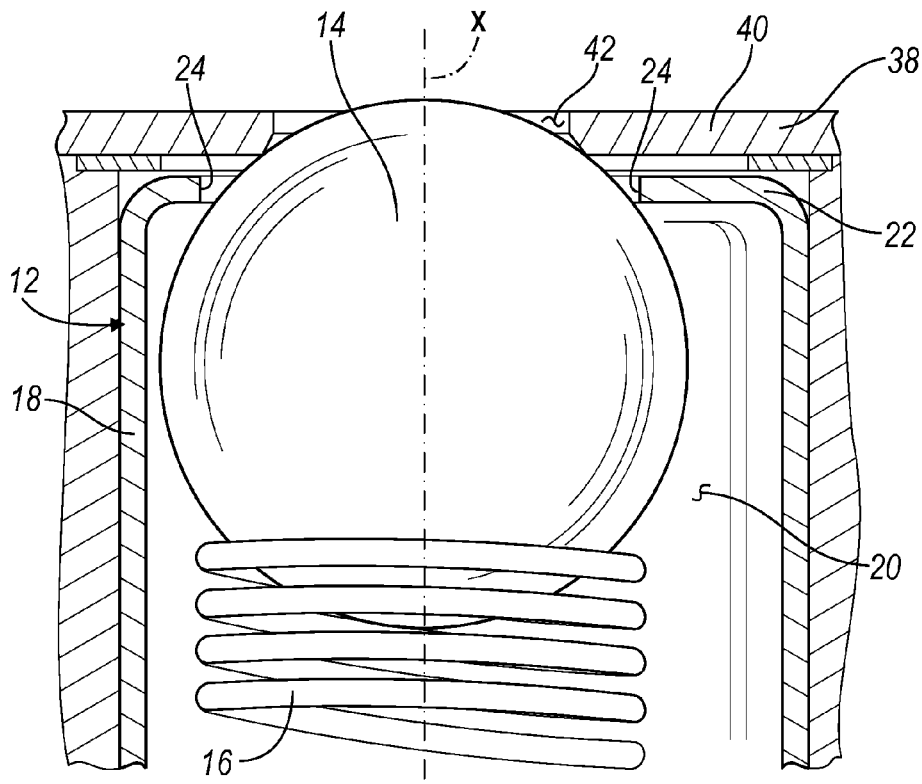
Figure 3B:
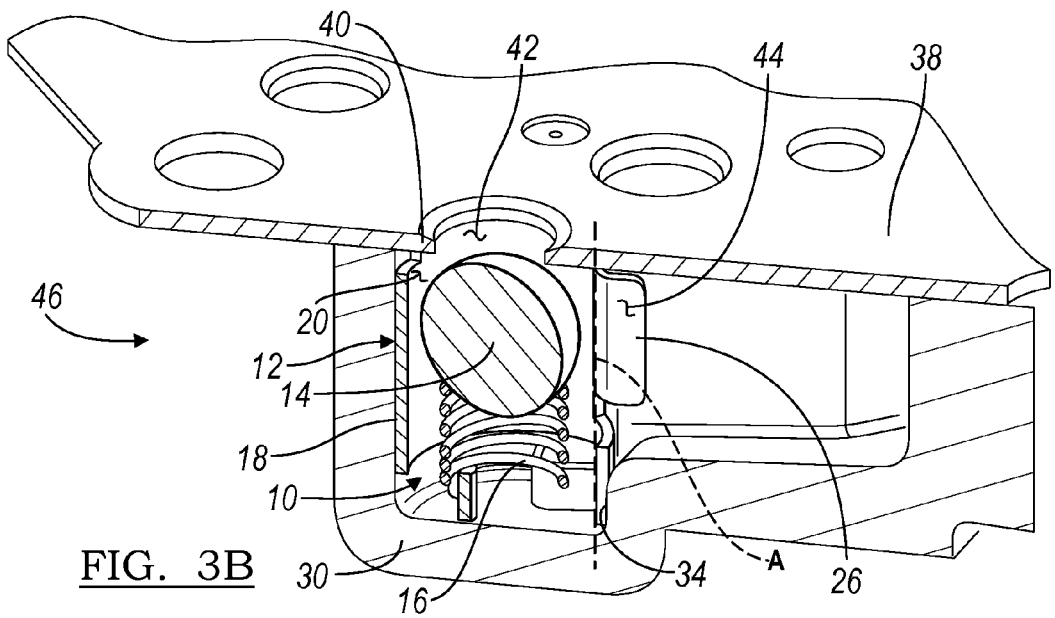

FIG. 3A is a cross-sectional view of the check ball valve cartridge assembly of FIGS. 1A-2 installed with a transfer plate to form a check ball valve assembly, according to the principles of the present disclosure; and FIG. 3B is a perspective cut-away view of the check ball valve cartridge assembly of FIGS. 1A-3A installed in a valve body with a transfer plate to form a check ball valve assembly, according to the principles of the present disclosure.

DETAILED DESCRIPTION

The following description is merely exemplary in nature and is not intended to limit the present disclosure, application, or uses.

Referring now to the drawings, wherein like reference numbers refer to like components, and specifically ith reference to FIGS. 1A-1D, a check ball cartridge valve assembly is illustrated and generally designated at 10. The check ball valve cartridge assembly 10 is designed for regulating fluid flow through a fluid pressure line of an automotive transmission. As such, the check ball valve cartridge assembly 10 is configured to be installed within an automotive transmission.

The check ball valve assembly 10 includes a cartridge 12 that houses a check ball 14 and a biasing member, such as a coil spring 16. The cartridge 12 has a generally cylindrical shape. Thus, the cartridge has a cylindrical side wall 18 forming a hollow interior cavity 20 in the cartridge 12. The cartridge 12 has a lip 22 extending from the side wall 18 inward toward a central axis X of the cartridge 12. Thus, the lip 22 blocks the check ball 14 from escaping from the interior cavity 20, which will be described in further detail below. The lip 22 has a lip edge 24 defining a lip opening.

When the cartridge is uninstalled from the transmission, the check ball 14 is disposed partially within the interior cavity 20 of the cartridge 12. The coil spring 16 biases the check ball 14 against the lip 22, and a portion of the check ball 14 protrudes through the opening defined by the lip edge 24. The coil spring 16 is disposed at least partially within the interior cavity 20 of the cartridge 12 and contacts the check ball 14. The lip 22 of the cartridge 12 is configured to prevent the check ball 14 from exiting the interior cavity 20 of the cartridge 12. The lip edge 24 defines a lip edge diameter L, the side wall 18 defines an interior cavity inner diameter C, and the check ball 14 defines a check ball diameter D. The interior cavity inner diameter C and the check ball diameter D are greater than the lip edge diameter L. The interior cavity inner diameter C is also greater than the check ball diameter D. Accordingly, the lip edge 24 prevents the check ball 14 (which has a larger diameter than the lip edge 24) from fully exiting the interior cavity 20. Instead, the check ball 14 may only partially protrude through the opening defined by the lip edge 24, as shown in FIGS. 1A-1D.

A pair of orientation features, such as flat tabs 26, extends from the side wall 18 of the cartridge 12. The flat tabs 26 are provided, at least in part, to align the cartridge 12 for installation. Each flat tab 26 contacts the side wall at a contact axis A, and the pair flat tabs 26 extend substantially perpendicular from the side wall 18 at the contact axes A. Each of the flat tabs 26 are disposed substantially parallel to each other as they each extend from the side wall 18. Thus, the flat tabs 26 define a gap between each other in the side wall 18.

To install the cartridge 12 within a transmission, the two flat tabs 26 are pressed toward each other, for example, by a person installing the cartridge 12. In other words, a compressive force is exerted on the outer sides 28 of the tabs 26, and the tabs 26 are pressed toward each other. When the tabs 26 are pressed toward each other, the diameter of the side wall 18 gets slightly smaller, which allows the cartridge to be fit into a hydraulic circuit assembly structure, such as a valve body 30 (see FIG. 2). The valve body 30 has portions forming an inner opening 31 having a cylindrical inner surface 32. When the tabs 26 are pressed together, the cartridge 12 is fit into the inner opening 31 of the valve body 30. Upon release of the tabs 26, the tabs 26 contact and press up against inner flat surfaces 34 of the valve body 30 and the outer side of the side wall 18 mates with the cylindrical inner surface 32 of the valve body 30. The cartridge 12 thus has a snug fit, or press fit, with the valve body 30. The cylindrical side wall 18 extends deeper into the valve body 30 than the tabs 26. The valve body 30 may have a flat surface 36 disposed under the tabs 26, which prevents the tabs 26 from being pressed too far into the valve body 30. For example, the flat surface 36 prevents the tabs 26 from being pressed into the valve body 30 past the flat surface 36. Thus, the flat surface 36 may serve as a guide for the depth at which the cartridge 12 is pressed into the valve body 30. The tabs 26 may also be pressed toward each other to remove the cartridge 12 from the valve body 30.

Once the cartridge 12 is pressed into the valve body 30, a mating structure, such as a transfer plate 38, is installed over the cartridge 12 and the valve body 30 (see FIGS. 3A-3B). The transfer plate 38 has a mating surface 40 forming an opening 42 therethrough. The mating surface 40 is disposed adjacent to the lip 22 of the cartridge 12. The mating surface 40 is disposed outside of the interior cavity 20 of the cartridge 12. The biasing member, such as the coil spring 16, is configured to bias the check ball 14 against and into contact with the mating surface 40 to seat the check ball 14 over the opening 42 of the mating surface 14. When the transfer plate 38 is installed over the cartridge 12, the check ball 14 remains free from contact with the lip edge 24 of the cartridge 12, because the check ball 14 seats over the opening 42 of the mating surface 14 but not over the opening formed by the lip edge 24. Instead, fluid is free to travel around the check ball 14 through the opening formed by the lip edge 24, once the cartridge 12 and the transfer plate 38 are installed over the valve body 30. In some embodiments, the check ball 14 is free from contact with the side wall 18 and the lip 22 when the cartridge 12 is installed.

The pair of flat tabs 26 defines a flow path opening 44 therebetween to allow fluid to flow through the flow path opening 44. Thus, the cartridge 12 and the transfer plate 38 form a check ball valve assembly 46 that includes a mating surface 40 on the transfer plate 38 for the check ball 14 to seat.

The check ball valve assembly 46 is a one-way valve. When a sufficient amount of fluid pressure is exerted on the check ball 14 from within the cartridge 12 (from under the check ball 14 in the orientation shown in FIGS. 3A-3B), the check ball 14 seats over the opening 42 of the mating surface 40, as shown in FIG. 3A. Conversely, when a sufficient amount of fluid pressure (such as line pressure) is exerted on the check ball 14 from outside of the cartridge 12, through the opening 42 of the transfer plate 38 (from above the check ball 14 in the origination shown in FIGS. 3A-3B), the check ball 14 is pushed against the spring 16, thereby compressing the spring 16 and unseating the check ball 14 from the opening 42 of the mating surface 40. Fluid may then flow around through the opening 42, past the check ball 14, and through the opening 44 between the tabs 26. Thus, when a predetermined amount of fluid pressure is exerted in a direction toward the valve seat created by the opening 42 of the mating structure 40, the check ball 14 seats on the opening 42. When a predetermined amount of fluid pressure flows away from the opening 42, the check ball 14 unseats.

Therefore, the check ball 14 is movable between first and second positions. In the first position, the check ball 14 is biased against and in contact with the transfer plate 38, and the check ball 14 is seated over the opening 42 of the transfer plate 38. In the second position, the check ball 14 is unseated from the transfer plate 38 and compressed against the coil spring 16.

The check ball valve assembly 46 may be formed of any suitable materials. For example, the check ball 14 may be formed of a metal, such as chrome alloy steel, and the spring may be formed of 186-M. The cartridge 12, the valve body 30, and the transfer plate 38 may be formed of steel, cast iron, or any other suitable material.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A check ball valve assembly for regulating fluid flow through a fluid pressure line in an automotive transmission, the check ball valve assembly comprising:
   a cartridge having a side wall forming a hollow interior cavity in the cartridge, the cartridge having a lip extending from the side wall toward a central axis of the cartridge,
   a check ball disposed at least partially within the interior cavity of the cartridge, the lip of the cartridge configured to prevent the check ball from exiting the interior cavity of the cartridge;
   a biasing member disposed at least partially within the interior cavity of the cartridge and contacting the check ball; and
   a mating surface forming an opening therethrough, the mating surface disposed adjacent to the lip of the cartridge, the mating surface being disposed outside of the interior cavity of the cartridge, the biasing member configured to bias the check ball against and into contact with the mating surface to seat the check ball over the opening of the mating surface.

2. The check ball valve assembly of claim 1, wherein the side wall has a cylindrical shape.

3. The check ball valve assembly of claim 2, wherein the lip has a lip edge defining a lip opening, the check ball being free from contact with the lip edge.

4. The check ball valve assembly of claim 3, wherein the lip edge defines a lip edge diameter and the side wall defines an interior cavity diameter, the interior cavity diameter being greater than the lip edge diameter.

5. The check ball valve assembly of claim 4, wherein the check ball has an outer check ball diameter that is greater than the lip edge diameter.

6. The check ball valve assembly of claim 2, further comprising an orientation feature extending from the side wall to align the cartridge.

7. The check ball valve assembly of claim 6, wherein the orientation feature is a first orientation feature, the check ball valve assembly further comprising a second orientation feature extending from the side wall.

8. The check ball valve assembly of claim 7, wherein the first and second orientation features define a flow path opening therebetween to allow fluid to flow through the flow path opening.

9. The check ball valve assembly of claim 8, wherein the first and second orientation features are flat tabs, the first and second orientation features being configured to be pressed toward each other to install or uninstall the cartridge from a hydraulic circuit assembly structure of the automotive transmission.

10. The check ball valve assembly of claim 9, wherein each orientation feature contacts the side wall at a contact axis, the orientation features extending substantially perpendicular from the side wall at the contact axes.

11. The check ball valve assembly of claim 10, wherein the orientation features are disposed substantially parallel to each other.

12. The check ball valve assembly of claim 5, further comprising a hydraulic circuit assembly structure, the hydraulic circuit assembly structure having portions forming an inner opening having a cylindrical surface, the cylindrical surface mating with an outer side of the side wall of the cartridge.

13. The check ball valve assembly of claim 12, wherein the hydraulic circuit assembly structure is a valve body of the automotive transmission.

14. The check ball valve assembly of claim 3, wherein the mating structure is a transfer plate.

15. The check ball valve assembly of claim 14, wherein the check ball is movable between first and second positions, wherein in the first position, the check ball is biased against and in contact with the mating surface, the check ball being seated over the opening of the mating surface, and wherein in the second position, the check ball is unseated from the mating surface and compressed against the biasing member.

16. The check ball valve assembly of claim 14, wherein the biasing member is a coil spring.

17. A check ball valve cartridge assembly for regulating fluid flow through a fluid pressure line, the check ball valve cartridge assembly configured to be installed within an automotive transmission, the check ball valve cartridge assembly comprising:
   a cartridge having a side wall forming a hollow interior cavity in the cartridge, the cartridge having a unitarily formed lip extending from the side wall toward a central axis of the cartridge;
   a check ball disposed at least partially within the interior cavity of the cartridge, the lip of the cartridge configured to prevent the check ball from exiting the interior cavity of the cartridge;
   a biasing member disposed at least partially within the interior cavity of the cartridge and contacting the check ball; and
   a pair of orientation features extending from the side wall for aligning the cartridge for installation within the automotive transmission, the pair of orientation features defining a flow path opening therebetween to allow fluid to flow through the flow path opening.

18. A check ball valve cartridge assembly for regulating fluid flow through a fluid pressure line, the check ball valve cartridge assembly configured to be installed within an automotive transmission, the check ball valve cartridge assembly comprising:

a cartridge having a side wall forming a hollow interior cavity in the cartridge, the cartridge having a lip extending from the side wall toward a central axis of the cartridge;

a check ball disposed at least partially within the interior cavity of the cartridge, the lip of the cartridge configured to prevent the check ball from exiting the interior cavity of the cartridge;

a biasing member disposed at least partially within the interior cavity of the cartridge and contacting the check ball; and a pair of orientation features extending from the side wall for aligning the cartridge for installation within the automotive transmission, the pair of orientation features defining a flow path opening therebetween to allow fluid to flow through the flow path opening wherein each orientation feature of the pair of orientation features is a flat tab, the pair of orientation features being configured to be pressed toward each other to install the cartridge within the automotive transmission.

19. The check ball valve cartridge assembly of claim 18, wherein each orientation feature of the pair of orientation features contacts the side wall at a contact axis, the pair of orientation features extending substantially perpendicular from the side wall at the contact axes, the pair of orientation features being disposed substantially parallel to each other.

20. A check ball valve assembly for regulating fluid flow through a fluid pressure line of an automotive transmission, the check ball valve assembly comprising:

a cartridge having a cylindrical side wall forming a hollow interior cavity in the cartridge, the cartridge having a lip extending from the side wall toward a central axis of the cartridge, the lip having a lip edge defining a lip opening, the lip edge defining a lip edge diameter, the side wall defining an interior cavity diameter;

a check ball disposed at least partially within the interior cavity of the cartridge, the lip of the cartridge configured to prevent the check ball from exiting the interior cavity of the cartridge, the check ball defining a check ball diameter, the interior cavity diameter and the check ball diameter being greater than the lip edge diameter;

a pair of flat tabs extending from the side wall for aligning the cartridge, each flat tab of the pair of flat tabs contacting the side wall at a contact axis, the pair flat tabs extending substantially perpendicular from the side wall at the contact axes, the pair of flat tabs being disposed substantially parallel to each other;

a coil spring disposed at least partially within the interior cavity of the cartridge and contacting the check ball;

a valve body having portions forming an inner opening having a cylindrical surface, the cylindrical surface mating with the side wall of the cartridge, the pair of flat tabs being configured to be pressed toward each other to insert the cartridge into the inner opening of the valve body, the pair of flat tabs defining a flow path opening therebetween to allow fluid to flow through the flow path opening; and a transfer plate having portions forming an opening through the transfer plate, the transfer plate disposed adjacent to the lip of the cartridge, the transfer plate being disposed outside of the interior cavity of the cartridge, the coil spring configured to bias the check ball against and into contact with the transfer plate to seat the check ball over the opening of the transfer plate, the check ball being free from contact with the lip edge, wherein the check ball is movable between first and second positions, wherein in the first position, the check ball is biased against and in contact with the transfer plate, the check ball being seated over the opening of the transfer plate, and wherein in the second position, the check ball is unseated from the transfer plate and compressed against the coil spring.

\* \* \* \* \*